E. W. ROBERTS.
HAT PIN PROTECTOR.
APPLICATION FILED SEPT. 6, 1910.
1,025,722.
Patented May 7, 1912.
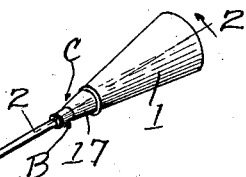
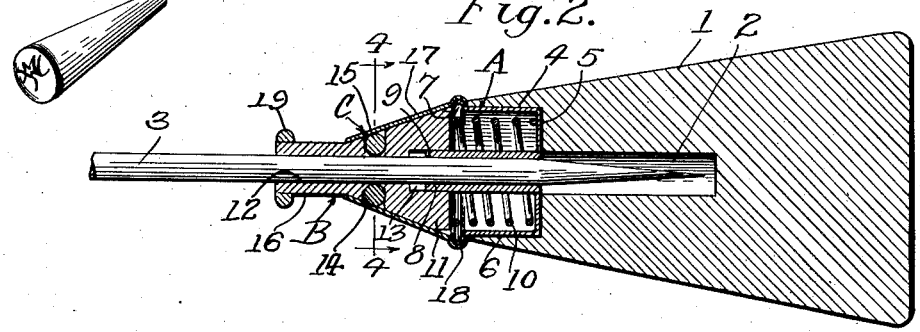
Witnesses:
Clarence J. Williams
Andrew Smith
Inventor,
Edward W. Roberts:
by Semer G. Wells,
Attorney.

UNITED STATES PATENT OFFICE.

EDWARD W. ROBERTS, OF LOS ANGELES, CALIFORNIA.

HAT-PIN PROTECTOR.

1,025,722.      Specification of Letters Patent.      Patented May 7, 1912.

Application filed September 6, 1910. Serial No. 580,681.

*To all whom it may concern:*

Be it known that I, EDWARD W. ROBERTS, a citizen of the United States, residing at Los Angeles, California, have invented a new and useful Hat-Pin Protector, of which the following is a specification.

My object is to improve the details of a hat pin protector and my invention consists of the novel features herein shown, described and claimed.

In the drawings: Figure 1 is a perspective of a hat pin provided with a pin protector, embodying the principles of my invention. Fig. 2 is an enlarged sectional detail of the hat pin protector taken on the line 2—2 of Fig. 1. Fig. 3 is an enlarged detail of the parts disconnected and ready to be assembled, some of the parts being shown in section and other parts being shown in elevation. Fig. 4 is an enlarged cross section on the line 4—4 of Fig. 2.

Referring to the drawings in detail: The head 1 may be of any suitable material and of any desired ornamental form or configuration; there being a chamber 2 extending from one end of the head to receive the point of the hat pin 3, and there being a chamber 4 at the outer end of the chamber 2 to receive the spring casing A.

The spring casing A comprises the bottom 5; an annular wall 6 extending from the bottom; the bead 7 extending from the edge of the annular wall 6 and the tubular guide 8 extending from the bottom 5, concentric with the annular wall 6; the passage 9 through the guide 8 extending through the bottom 5. The expansive coil spring 10 is placed in the spring casing around the tubular guide 8 and the clutch B is placed in the clutch casing C. The clutch B comprises the conical head 11, having a central bore 12 for the passage of the hat pin 3, said bore having the enlargement 13 at the large end of the head to receive the end of the tubular guide 8; and there being clutch ball sockets 14 formed from the periphery of the head and connecting with bore 12 to receive the clutch balls 15; and there being a tubular handle 16 extending from the apex of the conical head.

The clutch balls 15 are oval as shown in Fig. 4, and are placed with their longest axis crosswise of the axis of the pin 3. In forming the sockets 14 the tool is allowed to cut into the bore 12 just enough to allow the clutch balls 15 to clutch the pin 3, and not enough to allow the clutch balls 15 to fall into the bore 12.

The clutch casing C comprises the conical annular wall 17, having the bead 18 extending from the edge of its large end, and in assembling the parts the spring 10 is placed in the spring casing; the clutch is placed in position in the clutch casing, and the bead 18 is snapped over the bead 7, or the parts placed in position and the bead 18 spun in place over the bead 7. The ring 19 is placed upon the outer end of the handle 16 and held securely in position in any suitable way, such as making a tight fit, soldering, or the like. When the pin 3 is inserted through the bore 12, the point of the pin will pass between the clutch balls 15, forcing the balls outwardly and compressing the spring 10, and the tension of the spring 10 will cause the clutch balls 15 to grip the pin 3 and hold the hat pin protector from being withdrawn. When it is desired to withdraw the hat pin protector the ring 18 is pressed toward the head 1, thereby compressing the spring 10 and allowing the balls to spread apart and release the pin 3.

I claim:

A hat pin protector comprising a solid head having a chamber extending from one end to receive the point of a hat pin and a second chamber at the outer end of the first chamber to receive a spring casing; a spring casing mounted in the second chamber and comprising a bottom, an annular wall extending from the bottom, a bead extending from the edge of the annular wall, and a tubular guide extending from the center of the bottom, said tubular guide being in a line with the pin point chamber in the head; an expansive coil spring in the spring casing around the tubular guide; a clutch casing comprising a conical annular wall and a bead extending from the large end around the bead of the spring casing; and a clutch in the clutch casing against the spring and comprising a conical head having a central bore for the passage of a hat pin, said bore having an enlargement to receive the end of the tubular guide and having clutch ball sockets formed from the periphery of the head and opening into the bore, clutch balls in the clutch ball sockets, and a tubular handle extending from the conical head beyond the casing.

EDWARD W. ROBERTS.

Witnesses:
HANNA MENDENHALL,
ANDREW K. MARKET.

Copies of this patent may be obtained for five cents each, by addressing the "Commissioner of Patents, Washington, D. C."